May 26, 1931.  C. W. HOOVER  1,806,687
COUPLING
Filed Jan. 6, 1930

Inventor
C. W. Hoover,

By Robt. E. Barry
Attorney

Patented May 26, 1931

1,806,687

UNITED STATES PATENT OFFICE

CHARLES W. HOOVER, OF BURBANK, OKLAHOMA, ASSIGNOR TO PHILLIPS PETROLEUM COMPANY, OF BARTLESVILLE, OKLAHOMA, A CORPORATION OF DELAWARE

COUPLING

Application filed January 6, 1930. Serial No. 418,837.

This invention relates to improvements in rod or pipe couplings, and more especially to an emergency pull rod connection for joining the ends of a broken pull rod or shackle line. When such a line is broken in the oil fields, the ordinary practice is to file the broken ends off square, and then to upset these ends slightly by peening with a hammer. This upset fits into the reamed end of an emergency sleeve, and assists in preventing the sleeve from slipping on the pull rod. This method of cold heading pull rods, has been used for some time, but it has been found that with upset end pull rods, it is impossible to peen the end back, so that the cold head will assume the shape of the upset end. This cold heading operation also has the disadvantage that because the steel is cold-worked, it will crack and thus become weak.

The primary object of the present invention is to provide an emergency pull rod connection which will eliminate the necessity of filing the broken ends off square, or of peening such ends, so that the pumper can install the coupling and bring both ends of the rods together without outside assistance, and without the necessity of locating and transporting a new pull rod to the broken line.

A further object is to provide a coupling which may be expeditiously attached to the broken ends of the line, and which will securely hold said ends together.

A still further object is to provide a device of this character, of simple, durable and inexpensive construction.

The invention consists of the parts and the construction and combination of parts as hereinafter more fully described and claimed, having reference to the accompanying drawings, in which:

Figure 1:
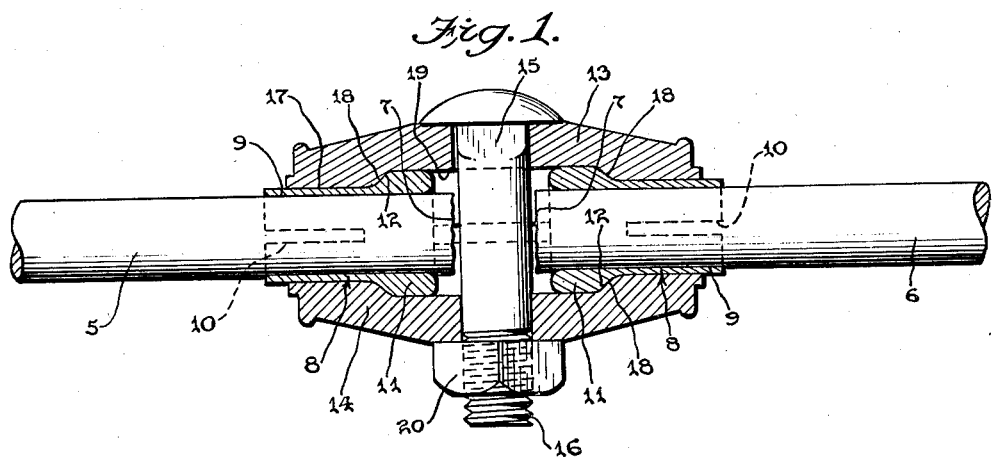
Fig. 1 is a diametrical sectional view of broken rod ends, shown connected together by my improved coupling.
Figure 2:
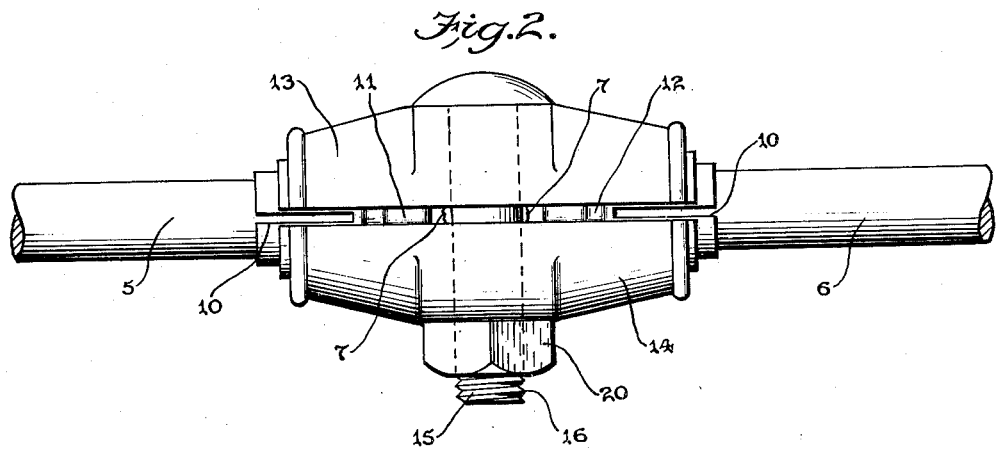
Fig. 2 is an elevation of the same.
Figure 3:
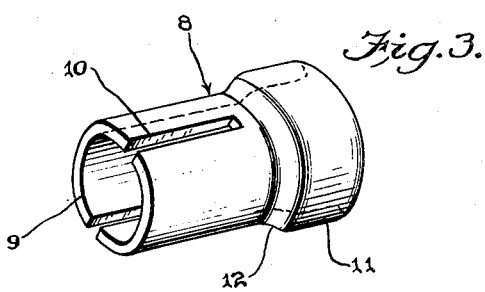
Fig. 3 is a perspective view of one of the emergency sleeves forming part of my device.

Referring to the drawings, 5 and 6 indicate broken rod ends, and it will be observed that in accordance with my invention, it is unnecessary to shape the broken ends, but they may be left rough, as indicated at 7. On each end, I place one of the special emergency sleeves 8, which is best shown in Fig. 3. Each sleeve has a cylindrical bore 9 of slightly greater diameter than the cylindrical rod, so that the sleeves may be readily slipped on to the rod end.

The outer end portion of each of these metal sleeves is slitted longitudinally, as shown at 10, so that this end of the sleeve may be contracted for the purpose of tightly gripping the rod, and while I have shown each sleeve as provided with two slits, it is obvious that any number of slits may be used, so long as they allow the outer end portion of the sleeve to contract so as to tightly grip the rod end.

The inner end of each sleeve is enlarged or thickened, as shown at 11, and an inclined or tapered annular surface 12 extends from the outer surface of the slitted portion of the sleeve, to the outer surface of the thickened portion of the sleeve.

These sleeves are used in combination with a split clamp or "turtle back", which is made up of clamping collars 13 and 14, each of which has an aperture 15 at its central portion, to permit a clamping bolt 16 to extend through the coupling, between the extremities of the broken rod line.

The inner surface of the outer end portion of each half collar is segmental cylindrical, or slightly tapered outwardly, as indicated at 17, and from these segmental cylindrical surfaces, semi-annular tapered surfaces 18 extend to semi-annular grooves 19 of the half collar. It will thus be seen that when the nut 20 on the bolt is tightened, the half collars will cause the split portions of the sleeves 8 to tightly grip the rod ends, and at the same time, the shoulders 12 cooperating with the shoulders 18, will prevent the half collars 13, 14 from pulling off the emergency sleeve.

In practice, it is advisable to leave the inside of each emergency sleeve 8 somewhat rough, so that there will be a friction engagement between the inside of the emergency connection, and the broken end of the pull rod on which it is used, and furthermore, as the two ends of the rod tend to move away from one another in use, this friction grip will be increased, because of the fact that the load applied on the emergency sleeves by the pull rod, will cause the thickened end of the sleeves to become distorted sufficiently to provide maximum engagement.

It has been found in actual practice, that the use of couplings of this character has effected a considerable saving of money for several reasons. One is that the pull rod on which the coupling is used, is saved, as the expense of the two sleeves and the "turtle back" is much less than the price of a pull rod. Another is the fact that the pumper, as before stated, can install the emergency sleeves and bring both ends of the rods together alone. Another advantage is, if the broken pull rod is of a special length, the use of my coupling eliminates the necessity of cutting a new pull rod to the special length.

While I have designed this coupling especially as an emergency connection for the broken ends of a pull rod, it will be manifest that it may be used for joining the ends of other rods or of pipes.

From the foregoing, it is believed that the invention may be clearly understood, and it is obvious that changes may be made in the details disclosed, without going outside of the scope of the appended claims.

What I claim and desire to secure by Letters Patent is:

1. A coupling comprising a plurality of one-piece sleeves having substantially cylindrical bores adapted to receive substantially cylindrical ends of a broken rod, each sleeve being provided with a longitudinal slit of less length than the sleeve to facilitate contraction of the same and also provided with an enlarged portion having a tapered outer surface, clamping half collars adapted to contract the slitted portions of the sleeves to cause them to tightly grip the rod ends, and also provided with complementary tapered inner surfaces engaging the tapered surfaces of the sleeves for contracting the enlarged portions of the sleeves when the rod ends are pulled away from each other, and means for forcing the half collars toward one another.

2. A coupling for rod ends or the like, having substantially cylindrical outer surfaces, comprising one-piece metallic sleeves having substantially cylindrical bores adapted to receive the ends of the rod, each of said sleeves having a slitted outer end portion and a thickened inner end portion of less length than the sleeve, and a tapered outer shoulder between its slitted portion and its thickened end portion, clamping half collars receiving said sleeves and having inner surfaces engaging the peripheries of the slitted end portions of the sleeves, and other inner tapered surfaces engaging the tapered surfaces of the sleeves, and means detachably securing the half collars together and for forcing the same toward one another.

3. An emergency pull rod connection for joining the ends of a broken pull rod or shackle line, comprising one-piece metallic sleeves having substantially cylindrical bores adapted to receive the ends of the rod, each of said sleeves having a slitted thin outer end portion and a thickened inner end portion of annular form, and a tapered external shoulder between its slitted portion and its thickened end portion, clamping half collars receiving said sleeves and having inner surfaces engaging the peripheries of the slit surfaces of the sleeves, and other tapered end portions of the sleeves, and other tapered inner surfaces engaging the tapered surfaces of the sleeves, and a bolt passing through said half collars and arranged between the sleeves for drawing the half collars toward one another.

In testimony whereof, I have signed this specification.

CHARLES W. HOOVER.